May 21, 1946.  F. A. PETERS  2,400,840
GAUGE
Filed Nov. 21, 1941  2 Sheets-Sheet 1
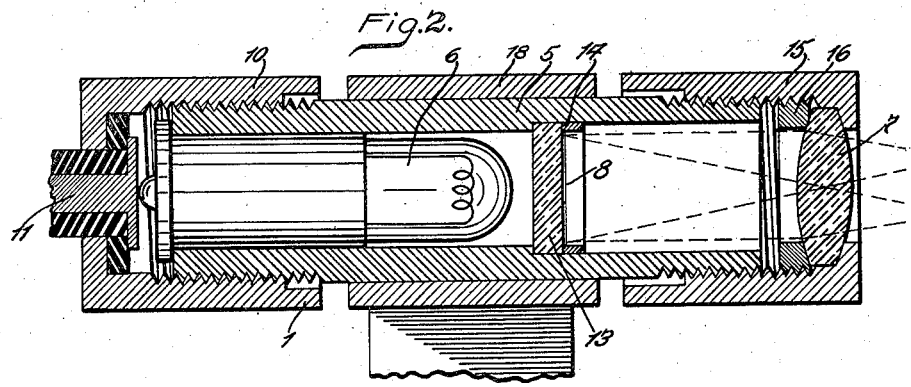
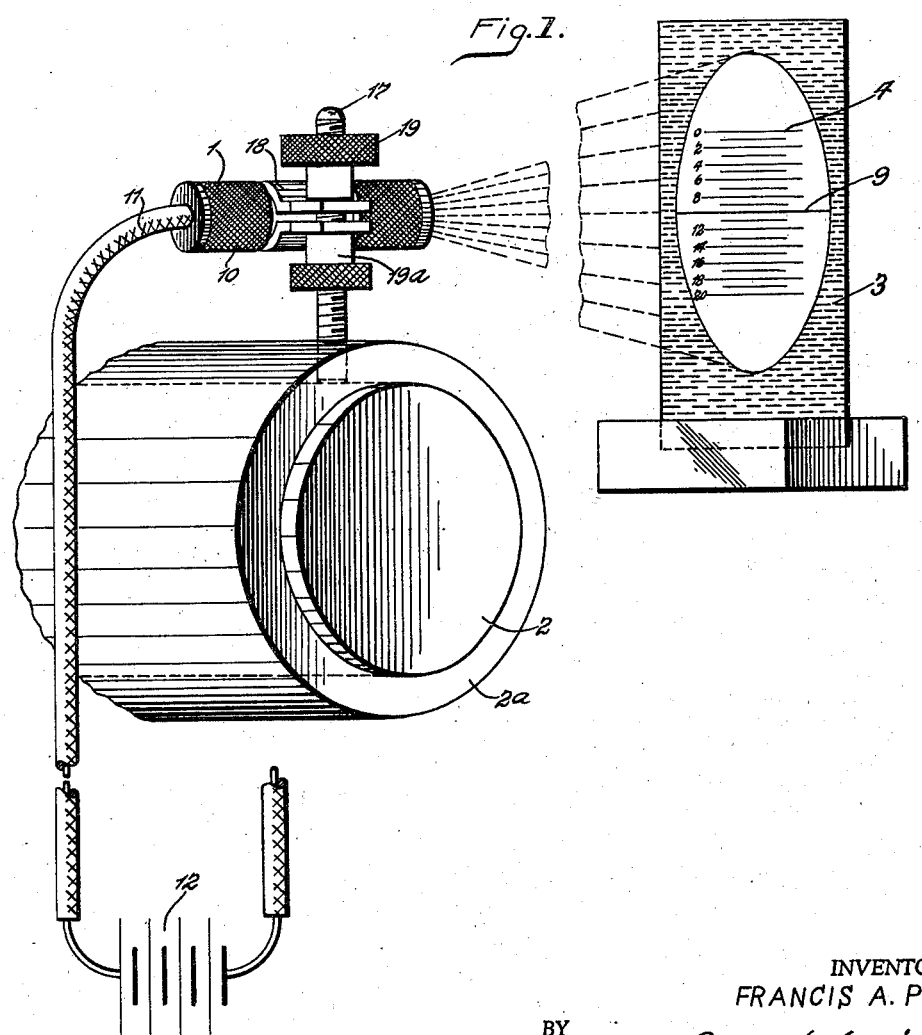
INVENTOR.
FRANCIS A. PETERS
BY
*John H. Lanidy*
HIS ATTORNEY.

May 21, 1946.　　　　　F. A. PETERS　　　　　2,400,840
GAUGE
Filed Nov. 21, 1941　　　　2 Sheets-Sheet 2

INVENTOR.
FRANCIS A. PETERS
BY
HIS ATTORNEY.

Patented May 21, 1946

2,400,840

UNITED STATES PATENT OFFICE 2,400,840

GAUGE

Francis A. Peters, St. Louis, Mo.

Application November 21, 1941, Serial No. 419,969

5 Claims. (Cl. 33—125)

This invention relates to a gauge or indicating instrument to be used alone or in conjunction with any type of machine, machine tool, measuring device, or the like.

An object of the present invention is to provide an attachment for such devices whereby measurements may be quickly obtained to an accuracy beyond that obtainable by ordinary means or methods. It may be used with any device of the class comprising machine tools, gauges and other devices which have a rotating or pivoted part from which measurements may be obtained.

One specific object is to provide a gauge which may be used with a machine tool and which will enable an operator to determine quickly and accurately when a piece of work is brought within the tolerances. When a machine tool is being used in production for repeated operations of like character, the gauge may be arranged so that a relatively inexperienced operator can bring the work immediately within the desired tolerances and may ascertain this merely by a glance at a light screen which is a part of the gauge. Similarly such a result may also be obtained in measuring devices for work inspection.

Another object of the invention is to provide an improved snap or comparitor gauge.

Further and detailed objects of the invention will be apparent from the following description of the device and its operation, taken in connection with the accompanying drawings.

Fig. 1 is a perspective view of the device associated with a shaft conventionally illustrated;

Fig. 2 is a horizontal section through a projector shown in Fig. 1;

Figure 3:
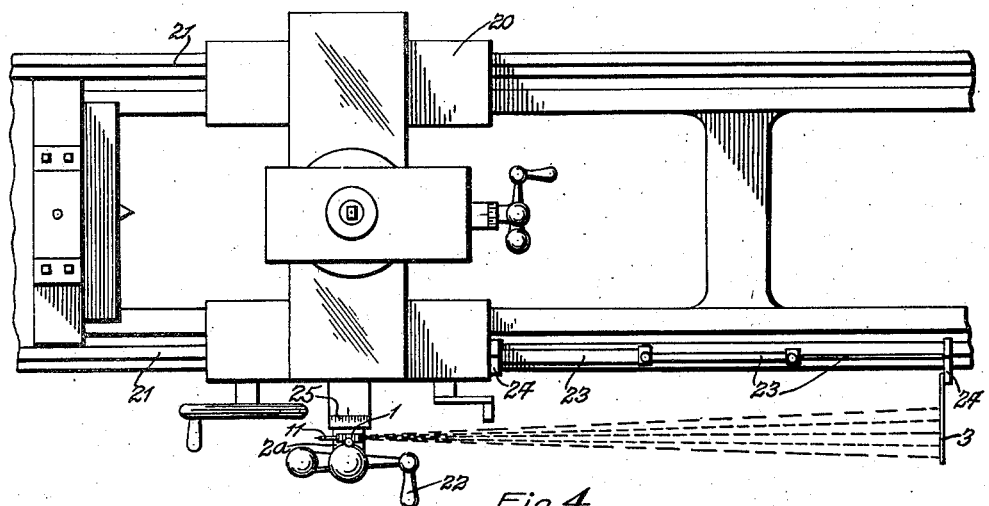
Fig. 3 is a plan view of a lathe with the present invention applied to it.

The invention includes a projector 1 for attachment to a shaft 2 or pivoted member of a machine tool, gauge or the like, and a screen 3 having a datum line or graduations 4 thereon. The projector as specifically illustrated includes a barrel 5, at one end of which is a lamp 6 and at the other end of which is a lens 7 with a cross-hair 8 therebetween. The arrangement is such that a shadow 9 of the cross-hair 8 will be projected upon the screen in a position to be compared with the datum line 4 or a series of reference lines or graduations on the screen. Where graduations or more than one reference line is used on the screen, any of those lines may be selected and used as a datum line. It will be understood that the position of the shadow 9 on the screen 3 will depend upon the rotational position of the shaft 2. That is, the movement of the shadow 9 on the screen 3, by reason of the rotation of the shaft 2, will depend on the angle of rotation.

As specifically illustrated, the projector 1 includes the barrel 5 with the lamp 6 held in position and in electrical contact by a threaded cap 10. The electrical connection is made against the terminal of a wire 11. This wire is connected to one side of a battery 12 having the other side grounded to the frame of a machine or device upon which the projector is mounted.

The cross-hair is held in position against a glass plate 13 by a ring 14. The lens 7 is mounted on a front piece 15, being held in position by a ring 16, while the member 15 is internally threaded to engage the front end of the barrel 5, thereby affording means of focusing.

For a means of attachment between the projector 1 and the shaft 2 any convenient devices may be employed, but as specifically shown in Fig. 1, a screw 17 is threaded radially in a sleeve 2a. For convenience the screw 17 is threaded directly into a sleeve 2a about the shaft 2. This sleeve can be rigidly secured to the shaft, and this may be done by the post 17. Such an arrangement is common, as in a lathe, Fig. 3, where the sleeve carries appropriate calibrations. A strap 18 is positioned about the barrel 5 with its ends engaged between a nut 19 and a shoulder 19a on the post or screw 17. The attachments are metallic and furnish a path for the electrical circuit supplying the lamp 6.

Figure 4:
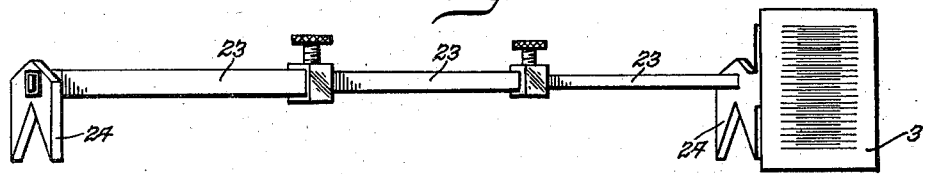
Fig. 4 is a perspective view of a spacer and screen incorporated in Fig. 3.

In Figs. 3 and 4 the invention is shown as applied to a lathe. The lathe is of conventional construction, and includes a carriage 20 which is slidably mounted on the bed of the lathe which includes rails 21. The carriage has a tool compound including a shaft, to which is attached a handle 22 and which has a sleeve 2a. That is to say, by turning the handle 22 the tool will be advanced laterally toward or against the work in a manner which is well understood in the art. The screen 3 is mounted on the outer end of a spacing member which includes rods 23, telescopically arranged and supported on feet or slides 24 having V-notches to match the upper surface of a rail 21. It will be understood that one end of the spacer will be placed against the side of the carriage 20, as clearly shown in Fig. 3. By properly arranging the rods 23 the screen 3 will be positioned a predetermined distance from the center of the shaft 2.

The invention is such that the parts may be arranged so that the variations in the position of the shadow 9 of the cross-hair 8 on the screen 3 may be quickly read and calculated. A specific example will be given. For instance, in the lathe as shown in Fig. 3, a conventional construction is such that a complete rotation of the shaft by the handle 22 will cause the cutting tool to be advanced .1 inch. Calibrations indicated by the numeral 25 on the sleeve 2a are usually in 100 parts. That is to say, a rotation of the shaft one space by the calibration, will advance the tool .001 inch, or cause a reduction in the diameter of the work of .002 inch.

By the present device very small divisional parts of a graduation may be read. Thus by calculation it may be shown that for an angle of rotation of 3.6° and a distance between the center of the shaft 2 and the screen of 19.885 inches, there will be a variation in the position of the shadow 9 of the cross-hair 8 of 1.25 inches. Therefore, if the screen 3 is calibrated with parallel horizontal lines spaced $\frac{1}{32}$ of an inch the distance between any two adjacent lines, the space therebetween will represent a variation of rotational position of the shaft of $\frac{1}{40}$ of a calibration 25 on the lathe tool, or $\frac{1}{4000}$ of a revolution of the shaft 2, or an advancement of the tool of .000025 inch, or a change in diameter of the work of .00005 inch. It is practicable to divide the scale on the screen into 64th of an inch, thus obtaining accurate measurements of the work on a scale of which each space represents .000025 of an inch in the work.

For absolute accuracy the screen should be circular, the radius of curvature being the predetermined distance from the center of the rotating shaft to the screen. For convenience in visualizing the action, the projector and beam may be thought of as a pointer attached to the rotating shaft, the circular screen maintaining a constant length of the so-called pointer.

Because of the sleeve arrangement it is apparent that in most cases a large length of screen is not needed, and for all practical purposes a short straight length of screen with equal calibrations is used, the midpoint of the screen being tangent to the radius of curvature. As the so-called pointer is moved away from the midpoint of the screen and towards the edge, the length of this so-called pointer increases. The error this introduced is so small as to be negligible. Compared to the length of the screen the radius of curvature is relatively large. Referring specifically to the example given above, the error incurred over the entire length of screen by not using a curved screen and having equal calibrations would be five ten-millionths of an inch in the work. By similar calculation it may be shown that a variance in the horizontal distance between the center of the shaft and the screen does not introduce a sizable error. For instance, if the screen were $\frac{1}{32}$ of an inch too long or too short of its exact mark, an error taken over the entire length of the screen, of only 1.5 millionths of an inch, would be shown in the work. In other words, the "set-up" may be comparatively rough and still produce extremely accurate work.

In the event a long length of screen be needed and this length be relatively long compared to the radius, then the calibrations on the screen would be of equal distance, the distance between calibrations being necessarily a function of the tangent of the angle of revolution.

Many methods of calibrating the screen and many methods of using such calibrations will be within the range of the skill of the mechanic in this art. A movable pointer may be used on the scale, or the scale may be movable with reference to a fixed pointer.

In production work a scale having but two spaced lines thereon may be sufficient. If, for instance, work is being done which has a tolerance of .0001 inch over or under, two lines may be used spaced ⅛ inch apart. The work may be set up and the scale adjusted so that on a perfect piece of work the shadow 9 will fall accurately between the two calibrations. Then on repeated work, with the setting as indicated in the example given, the repeated work will be turned within the allowed tolerances when the shadow 9 falls anywhere within the two parallel marks. It will be seen, therefore, that an inexperienced workman may be easily able to bring the work within the desired tolerances. Merely a glance at the screen discloses whether this has been done.

These suggested measurements and uses are by way of illustration only, to assist in understanding the invention, and not by way of limitation.

It is possible, instead of using the screen as a visual indicator, that a signaling system controlled by a photoelectric cell may be employed. For this purpose a slot would be cut in the screen with the cell behind the slot, in which case a shadow falling upon the slot would interrupt electric current flowing through the cell.

Figure 5:
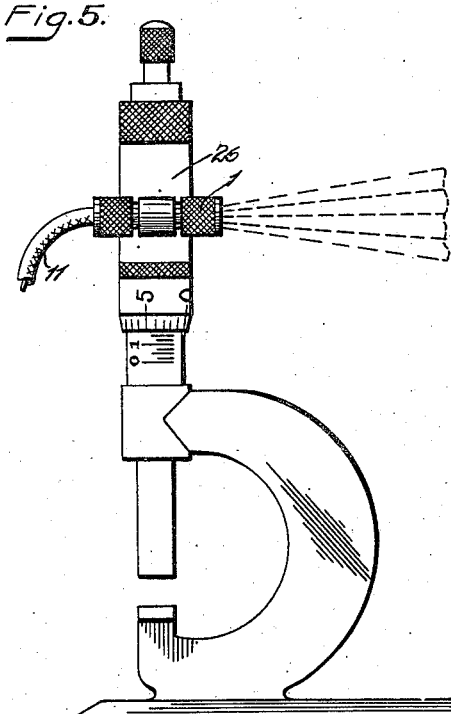
Fig. 5 is an elevational view of the invention applied to a micrometer.

Fig. 5 illustrates the projector 1 applied to the barrel 26 of a micrometer gauge. By this method, and as previously explained, very minute variations in the rotational position of the barrel 26 may be read.

Figure 6:
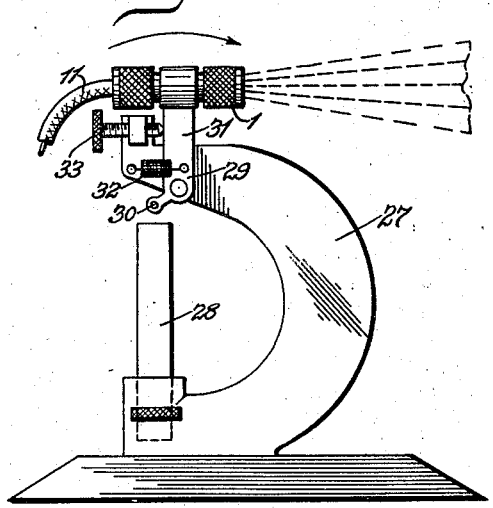
Fig. 6 is an elevational view of the invention in a novel snap gauge.

Fig. 6 illustrates the invention applied in a novel snap gauge. A frame 27 supports an adjustable post or anvil 28 and pivotally supports a tappet 29. Work to be measured is placed between the anvil and tappet, whereby the throw of the tappet will depend upon the size of the work. The tappet, as specifically illustrated, is in the form of a bell crank lever, having arms 30 and 31. The arm 30 engages the work to be measured while the arm 31 carries the projector 1. The tappet 29 is normally urged by a spring 32 against an adjustment screw 33. With this gauge, where it is used for repeated measurements on work of the same character, a screen calibrated with two reference lines representing the under and over permissible limits of the work will be of particular value and utility. In such a case, a glance at the screen, once properly adjusted, will show whether the work is within the required tolerance.

Various changes may be made in the details of construction, and many applications and uses of the invention may be found, within the scope of the appended claims, without departing from the spirit of this invention.

I claim:

1. In a device of the class comprising machine tools and gauges and having a rotating member, the combination comprising a light projector secured to said member and rotating therewith including a lamp, a lens and a cross-hair between the lamp and lens, and a screen spaced from said member with a datum line thereon to receive the shadow of the cross-hair from the projector.

2. In a machine of the class described comprising machine tools and gauges and having a rotating member, a light projector secured to said member and comprising a barrel, a lamp in one end of the barrel, a lens in the other end, and a cross-hair between the lamp and lens.

3. In a lathe, having a bed, a carriage slidably mounted on the bed and a tool compound on the carriage including a shaft for advancing the tool, the improvement comprising a light projector secured to the shaft, a spacer slidably mounted on the bed and having an end adapted to engage a side of the carriage, and a screen mounted on the far end of the spacer and positioned to receive light rays from the projector.

4. In a machine tool having means for supporting work, an instrument for affecting the work, and a rotating member for adjusting the relative position of the work and the instrument, the improvement comprising a light projector secured to the rotating member, and a screen spaced a predetermined distance from the said rotating member and positioned to receive light rays from the projector.

5. In a machine tool having means for supporting work, an instrument for affecting the work, and a rotating member for adjusting the relative position of the work and the instrument, the improvement comprising a light projector secured to the rotating member, said projector comprising a lamp, a lens and a cross-hair between the lamp and the lens, and a screen spaced a predetermined distance from the rotating member with a datum line thereon to receive a shadow of the cross-hair from the projector.

FRANCIS A. PETERS.